US011538456B2

(12) United States Patent
Lai

(10) Patent No.: US 11,538,456 B2
(45) Date of Patent: Dec. 27, 2022

(54) AUDIO FILE PROCESSING METHOD, ELECTRONIC DEVICE, AND STORAGE MEDIUM

(71) Applicant: TENCENT TECHNOLOGY (SHENZHEN) COMPANY LIMITED, Shenzhen (CN)

(72) Inventor: Chunjiang Lai, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 261 days.

(21) Appl. No.: 16/844,283

(22) Filed: Apr. 9, 2020

(65) Prior Publication Data
US 2020/0234689 A1 Jul. 23, 2020

Related U.S. Application Data

(63) Continuation of application No. PCT/CN2018/114179, filed on Nov. 6, 2018.

(30) Foreign Application Priority Data

Nov. 6, 2017 (CN) .......................... 201711076391.5

(51) Int. Cl.
G10L 13/033 (2013.01)
G10L 13/04 (2013.01)
(Continued)

(52) U.S. Cl.
CPC ............ *G10L 13/033* (2013.01); *G10L 13/04* (2013.01); *H04N 21/8106* (2013.01); *H04N 21/8456* (2013.01)

(58) Field of Classification Search
CPC .................. G10L 13/033; G10L 13/04; H04N 21/8106; H04N 21/8456
See application file for complete search history.

(56) References Cited

U.S. PATENT DOCUMENTS 6,948,131 B1 * 9/2005 Neven ...................... H04N 7/15
348/E7.083
8,731,905 B1 * 5/2014 Tsang .................... G06F 40/205
704/4
(Continued)

FOREIGN PATENT DOCUMENTS

CN 101189657 A 5/2008
CN 101199146 A 6/2008
(Continued)

OTHER PUBLICATIONS

The World Intellectual Property Organization (WIPO) International Search Report for PCT/CN2018/114179 Jan. 25, 2019 6 Pages (including translation).

(Continued)

*Primary Examiner* — Paras D Shah
*Assistant Examiner* — Nicole A K Schmieder
(74) *Attorney, Agent, or Firm* — Anova Law Group PLLC

(57) ABSTRACT

An audio file processing method is provided for an electronic device. The method includes extracting at least one audio segment from a first audio file, recognizing at least one to-be-replaced audio segment representing a target role from the at least one audio segment, and determining time frame information of each to-be-replaced audio segment in the first audio file. The method also includes obtaining to-be-dubbed audio data for each to-be-replaced audio segment, and replacing data in the to-be-replaced audio segment with the to-be-dubbed audio data according to the time frame information, to obtain a second audio file. The at least one to-be-replaced audio segment is divided from the at least one audio segment based on a structure and a word count in a sentence corresponding to each to-be-replaced audio segment.

4 Claims, 8 Drawing Sheets

(51) Int. Cl.
*H04N 21/81* (2011.01)
*H04N 21/845* (2011.01)

(56) References Cited

U.S. PATENT DOCUMENTS

| | | |
|---|---|---|
| 2008/0195386 A1 | 8/2008 | Proidl et al. |
| 2009/0006093 A1* | 1/2009 | Das .................. G10L 17/10 704/246 |
| 2009/0037179 A1* | 2/2009 | Liu .................. G10L 13/08 704/260 |
| 2009/0055189 A1 | 2/2009 | Stuart et al. |
| 2013/0151251 A1 | 6/2013 | Herz et al. |
| 2015/0199978 A1* | 7/2015 | McCoy ............... G10L 21/10 704/270 |
| 2016/0021334 A1* | 1/2016 | Rossano ............ H04N 5/9305 704/2 |
| 2018/0330756 A1* | 11/2018 | MacDonald ......... G06F 16/951 |
| 2020/0058289 A1* | 2/2020 | Gabryjelski ......... G10L 17/00 |

FOREIGN PATENT DOCUMENTS

| | | |
|---|---|---|
| CN | 103035247 A | 4/2013 |
| CN | 103997657 A | 8/2014 |
| CN | 105244026 A | 1/2016 |
| CN | 105828220 A | 8/2016 |
| CN | 105898556 A | 8/2016 |
| CN | 105959773 A | 9/2016 |
| CN | 106293347 A | 1/2017 |
| CN | 107071512 A | 8/2017 |
| CN | 107293286 A | 10/2017 |
| CN | 108305636 A | 7/2018 |

OTHER PUBLICATIONS

The State Intellectual Property Office of the People's Republic of China (SIPO) Office Action 1 for 201711076391.5 Apr. 29, 2019 9 Pages (including translation).

* cited by examiner

AUDIO FILE PROCESSING METHOD, ELECTRONIC DEVICE, AND STORAGE MEDIUM

RELATED APPLICATIONS

This application is a continuation application of PCT Patent Application No. PCT/CN2018/114179, filed on Nov. 6, 2018, which claims priority to Chinese Patent Application No. 201711076391.5, entitled "AUDIO FILE PROCESSING METHOD AND DEVICE" and filed with the Chinese Patent Office on Nov. 6, 2017, all of which are incorporated by reference in entirety.

FIELD OF THE TECHNOLOGY

This application relates to the field of voice processing technologies and, in particular, to an audio file processing method, an electronic device, and a storage medium.

BACKGROUND

Currently, when a user watches a video, such as a movie or a TV play, or listens to an audio file, such as a book or a broadcast, a voice in the file is recorded in advance, and the user is not free to choose a voice of a leading actor or a host. Therefore, a personal preference of the user cannot be satisfied.

However, in a production or recording process of movies and television plays, dubbing is time and labor consuming. Using the movie as an example, currently, dubbing of a leading role is mainly implemented manually, and the manually recorded voice is synthesized into the movie by post processing of the movie. However, the entire process has a low degree of automation, and is time and labor consuming, resulting in high costs of manpower and time, reducing resource utilization of an audio processing device.

SUMMARY

In view of this, embodiments of the present disclosure provide technical solutions for an audio file processing method, an electronic device, and a storage medium, and provide an automatic dubbing scheme, to improve time efficiency of audio replacement and consume a relatively small quantity of memory resources, thus improving resource utilization of an audio file processing device.

One aspect of the present disclosure provides an audio file processing method for an electronic device. The method includes extracting at least one audio segment from a first audio file, recognizing at least one to-be-replaced audio segment representing a target role from the at least one audio segment, and determining time frame information of each to-be-replaced audio segment in the first audio file. The method also includes obtaining to-be-dubbed audio data for each to-be-replaced audio segment, and replacing data in the to-be-replaced audio segment with the to-be-dubbed audio data according to the time frame information, to obtain a second audio file. The at least one to-be-replaced audio segment is divided from the at least one audio segment based on a structure and a word count in a sentence corresponding to each to-be-replaced audio segment.

Another aspect of the present disclosure provides an electronic device. The electronic device includes a processor and a memory. The memory stores computer instructions executable by the processor. The processor is configured to execute the computer instruction to perform: extracting at least one audio segment from a first audio file; recognizing at least one to-be-replaced audio segment representing a target role from the at least one audio segment; determining time frame information of each to-be-replaced audio segment in the first audio file; obtaining to-be-dubbed audio data for each to-be-replaced audio segment, and replacing data in the to-be-replaced audio segment with the to-be-dubbed audio data according to the time frame information, to obtain a second audio file. The at least one to-be-replaced audio segment is divided from the at least one audio segment based on a structure and a word count in a sentence corresponding to each to-be-replaced audio segment.

Another aspect of the present disclosure provides a non-transitory computer-readable storage medium. The non-transitory computer-readable storage medium stores computer program instructions executable by at least one processor to perform: extracting at least one audio segment from a first audio file; recognizing at least one to-be-replaced audio segment representing a target role from the at least one audio segment; determining time frame information of each to-be-replaced audio segment in the first audio file; obtaining to-be-dubbed audio data for each to-be-replaced audio segment, and replacing data in the to-be-replaced audio segment with the to-be-dubbed audio data according to the time frame information, to obtain a second audio file. The at least one to-be-replaced audio segment is divided from the at least one audio segment based on a structure and a word count in a sentence corresponding to each to-be-replaced audio segment.

Other aspects of the present disclosure can be understood by those skilled in the art in light of the description, the claims, and the drawings of the present disclosure.

BRIEF DESCRIPTION OF THE DRAWINGS

To describe the technical solutions of the embodiments of the present disclosure or the existing technology more clearly, the following briefly describes the accompanying drawings required for describing the embodiments or the existing technology. Apparently, the accompanying drawings in the following description show only some embodiments of the present disclosure, and persons skilled in the art may still derive other drawings from these accompanying drawings without creative efforts.

DETAILED DESCRIPTION

To make the objectives, features, and advantages of the present disclosure clearer and more comprehensible, the following describes the technical solutions in the embodiments of the present disclosure with reference to the accompanying drawings. Apparently, the embodiments described are merely some rather than all of the embodiments of the present disclosure. Other embodiments obtained by a person skilled in the art based on the embodiments of the present disclosure without creative efforts shall fall within the protection scope of the present disclosure.

Figure 1:
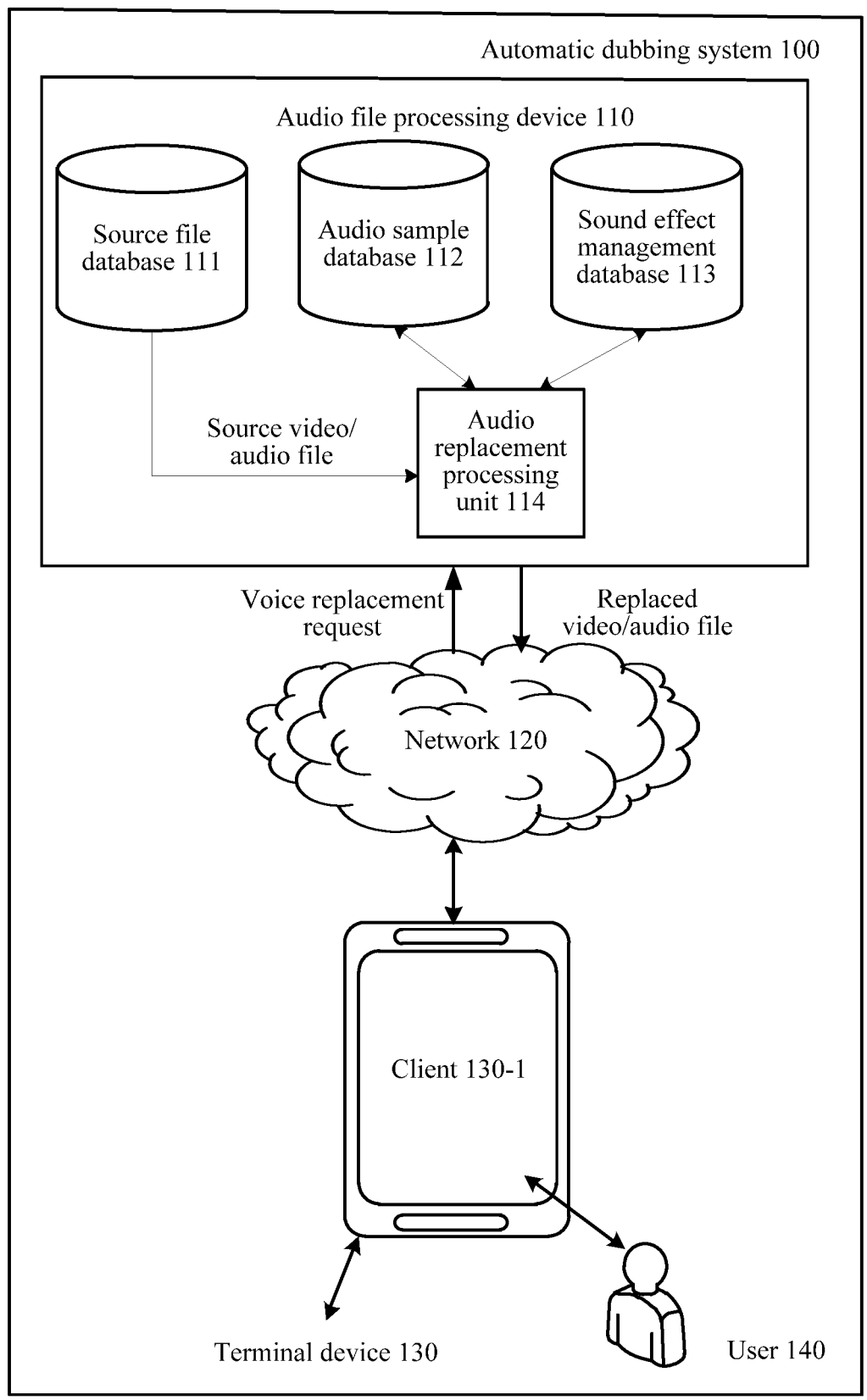
FIG. 1 is a schematic diagram of an implementation environment according to an embodiment of the present disclosure.

FIG. 1 is a schematic diagram of an implementation environment according to an embodiment of the present disclosure. As shown in FIG. 1, an automatic dubbing system 100 includes an audio file processing device 110, a network 120, a terminal device 130, and a user 140. The audio file processing device 110 includes a processor and a memory. A method embodiment in the present disclosure is performed by a processor executing an instruction stored in the memory.

Specifically, the audio file processing device 110 includes a source file database 111, an audio sample database 112, a sound effect management database 113, and an audio replacement processing unit 114. A client 130-1 is installed on the terminal device 130. The user 140 can watch a video or listen to audio after logging into the client 130-1.

In one embodiment of the present disclosure, the source file database 111 stores a to-be-replaced source video file or a to-be-replaced source audio file. The audio sample database 112 stores various types of voice samples for replacement, for example, a standard male voice, a standard female voice, and a star voice that are collected in advance. The sound effect management database 113 is provided with a corresponding processing module and stores various audio styles and emotion types.

When watching the video or listening to the audio after logging into the client 130-1, the user 140 wants to replace a voice of a target role (for example, a leading actor or a host). In this case, the user 140 inputs an operation on the terminal device 130 to initiate a voice replacement request for the target role. The client 130-1 sends the voice replacement request to the audio file processing device 110. The audio replacement processing unit 114 obtains, based on the voice replacement request, a source video file or a source audio file from the source file database 111 and an audio sample from the audio sample database 112, generates to-be-dubbed audio data, performs audio replacement processing, outputs a replaced video/audio file, that is, a re-dubbed file, and returns the re-dubbed file to the client 130-1. Before performing audio replacement, the audio replacement processing unit 114 may further invoke a corresponding sound effect processing module in the sound effect management database 113 to perform filtering processing on the audio data.

The audio file processing device 110 may be a server, or a server cluster that includes a plurality of servers, or a cloud computing service center. The network 120 may connect the audio file processing device 110 and the terminal device 130 in a wireless or wired manner. The terminal device 130 may be an intelligent terminal, including an intelligent television, a smartphone, a tablet computer, a laptop portable computer, or the like.

Figure 2:
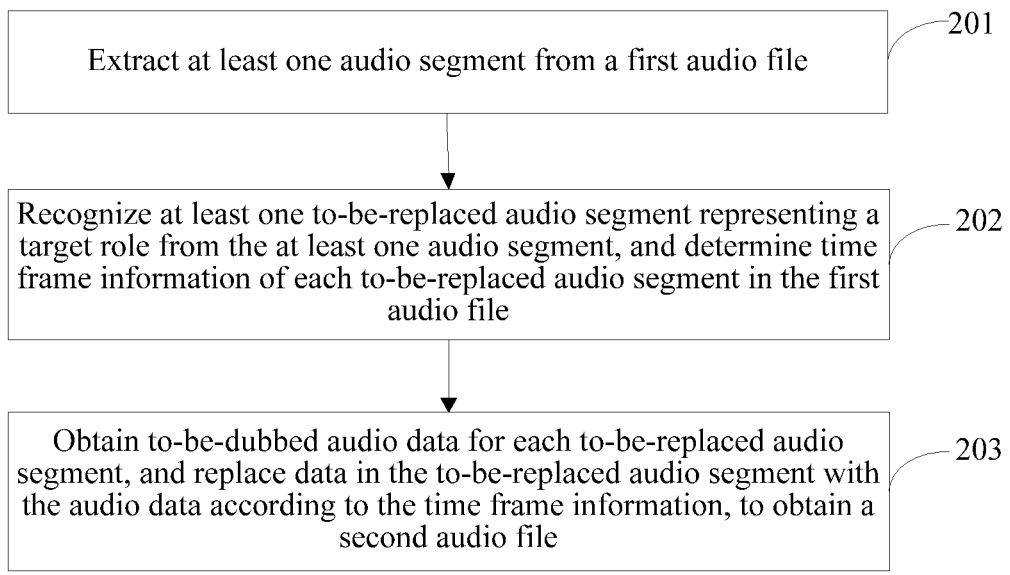
FIG. 2 is a schematic flowchart of an audio file processing method according to an embodiment of the present disclosure.

FIG. 2 is a schematic flowchart of an audio file processing method according to an embodiment of the present disclosure. The method may be applied to an audio file processing device or an electronic device such as a server. The method includes the followings.

Step 201. Extract at least one audio segment from a first audio file. The first audio file is a source file before audio replacement. According to different scenarios, there may be two ways to obtain the first audio file:

First, a voice replacement request for a target role in a source video file is received from a client, and the first audio file is separated from the source video file according to the voice replacement request.

A corresponding application scenario is that a user watches a video, for example, a movie, a TV play, or an entertainment program, on the client. The voice replacement request carries an identifier of the source video file and an identifier of the target role.

Figure 3A:
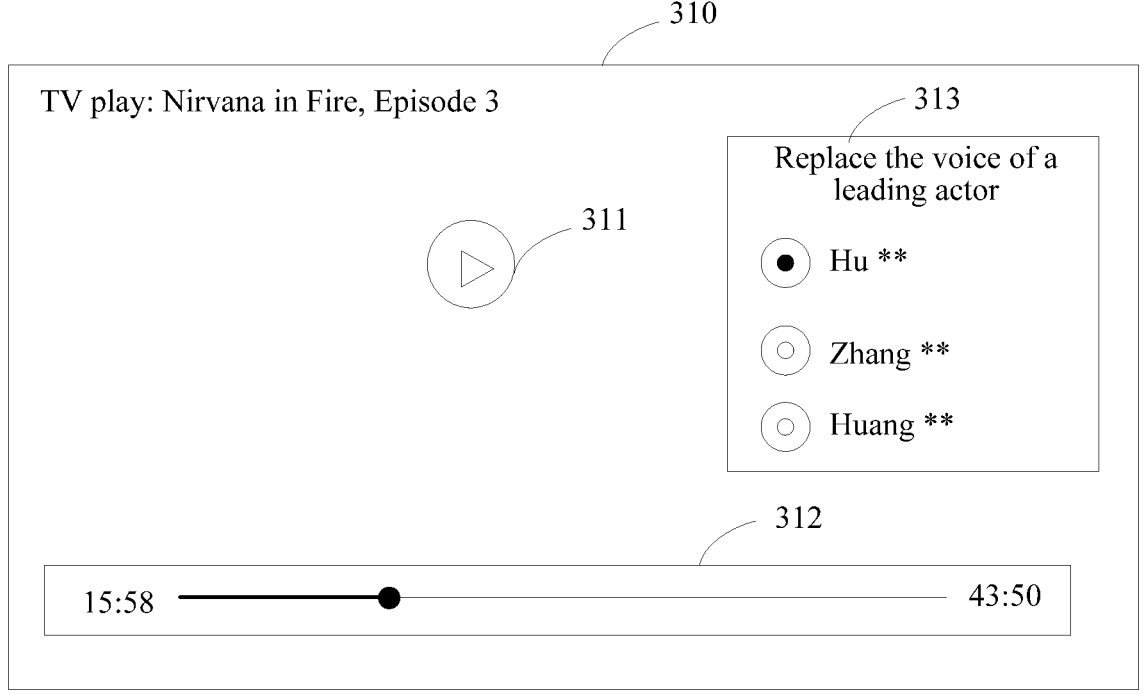
FIG. 3A is a schematic diagram of an interface of a client initiating a voice replacement request according to an embodiment of the present disclosure.

FIG. 3A is a schematic diagram of an interface of a client initiating a voice replacement request according to an embodiment of the present disclosure. As shown in FIG. 3A, a play screen of "TV play: Nirvana in Fire, Episode 3" is displayed on an interface 310, and the user clicks a play button 311 to watch the episode, where 312 is a progress control button. When the user is unsatisfied with a voice of a leading actor and wants to replace the voice of the leading actor, the user right-clicks on the interface 310. A window 313 pops up, and the user selects, in the window, the leading actor whose voice needs to be replaced. For example, the user chooses to replace the voice of the leading actor "Hu\*\*". In this case, the client sends a voice replacement request to the audio file processing device, and the request includes an identifier of Episode 3 of Nirvana in Fire and an identifier of a target role "Hu\*\*".

After receiving the voice replacement request, the audio file processing device obtains the source video file according to the identifier of the TV play in the request, and then separates the first audio file from the source video file. For example, an entire video file is read, and a pure audio file is extracted from the entire video file as the first audio file by transcoding.

Second, a voice replacement request for a target role in a source audio file is received from a client, and the source audio file is determined as the first audio file.

In this case, a corresponding application scenario is that a user listens to audio on the client, for example, listening to books, listening to lectures, or listening to online courses. The voice replacement request carries an identifier of the source audio file and an identifier of the target role.

In a specific application, considering that the target role is a host in the scenario, the voice of the host is usually the only human voice in the audio file. Therefore, the voice replacement request may only carry the identifier of the source audio file.

Figure 3B:
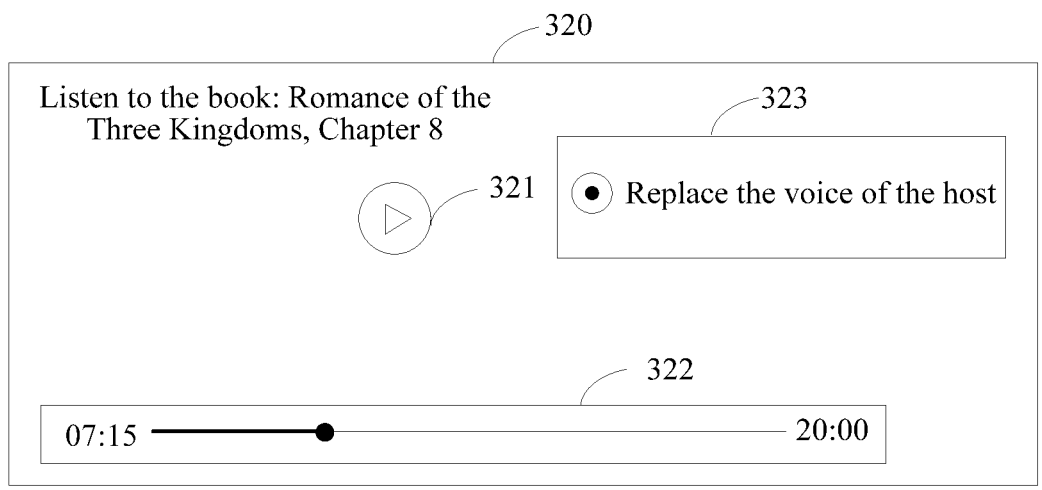
FIG. 3B is a schematic diagram of an interface of a client initiating a voice replacement request according to another embodiment of the present disclosure.

FIG. 3B is a schematic diagram of an interface of a client initiating a voice replacement request according to another embodiment of the present disclosure. As shown in FIG. 3B, a play screen of "listening to the book: Romance of the Three Kingdoms, Chapter 8" is displayed on an interface 320, and a user clicks a play button 321 to listen to the audio, where 322 is a progress control button. When the user wants to replace the voice of the host, the user right-clicks on the interface 320. A window 323 pops up, and the user selects an option "replace the voice of the host" in the window. In this case, the client sends a voice replacement request carrying an identifier of "listening to the book: Romance of the Three Kingdoms, Chapter 8" to the audio file processing device.

After receiving the voice replacement request, the audio file processing device obtains the source audio file as the first audio file according to the identifier of the audio file in the request.

In addition, when an audio segment is extracted from the first audio file, voice detection may be performed on data in the first audio file, and a part of continuous data of the detected voice is used as an audio segment. For example, appearance and disappearance of a voice are determined by detecting fluctuations of sound wave energy in the audio data. A time point when voice appearance is detected is taken as a start time, a time point when voice disappearance is detected is taken as an end time, and continuous audio data between the start time and the end time is taken as an audio segment.

Step 202. Recognize at least one to-be-replaced audio segment representing a target role from the at least one audio segment, and determine time frame information of each to-be-replaced audio segment in the first audio file.

In this step, the recognizing at least one to-be-replaced audio segment representing a target role from the at least one audio segment specifically includes the following two steps.

Step 2021. Extract an audio feature of each audio segment.

In a specific application, the audio feature may be extracted by means of machine learning. Specifically, each audio segment is input into a convolutional neural network for training, to obtain the audio feature of each audio segment. The audio feature includes any one or more of a timbre, a frequency, a gender, emotion, and a peak distance of a voice.

In general, the convolutional neural network includes processing at a plurality of layers, for example, a convolution layer, a pooling layer, a fully meshed layer, and an output layer. The convolution layer is provided with a convolution matrix as a filter, which can filter out the audio feature (or referred to as an audio fingerprint) in the audio segment. In an actual application, a plurality of convolution layers may be designed for deep learning, and a multidimensional composite audio feature may be extracted.

Alternatively, a deep learning-based long-short-term memory (LSTM) model may be used for training, and it is suitable for audio feature extraction of a long audio file by memory and association.

Step 2022. Recognize at least one to-be-replaced audio segment representing a target role from at least one audio segment according to the audio feature.

In a specific application, a binary classification model is established based on the target role; each audio segment and the audio feature of the audio segment are inputted into the binary classification model, training is performed based on a logistic regression algorithm, and the at least one to-be replaced audio segment is determined according to a training result.

Considering that recognition between a leading actor and a supporting actor or recognition between a host and a background sound in the audio file belongs to a 0-1 relationship, which conforms to the binary classification model. Therefore, when the binary classification model is established, the target role may be set to 1, and a non-target role is set to 0. When a voice of the target role is recognized, binary classification model training is performed by using a logistic regression-based machine learning algorithm.

Step 203. Obtain to-be-dubbed audio data for each to-be-replaced audio segment, and replace data in the to-be-replaced audio segment with the audio data according to the time frame information, to obtain a second audio file.

In this step, the time frame information includes duration. When the to-be-dubbed audio data is obtained, to-be-replaced sentences corresponding to the to-be-replaced audio segment can be determined from preset sentence text information according to the duration, and the to-be-dubbed audio data is generated according to the to-be-replaced sentences and preset audio sample data. That is, the present audio sample data may include a database of audio data samples for a large amount of sentences to be used in the replacement operation, and the replacement audio can be determined from the preset audio sample data based on the to-be-replaced sentences.

In this way, duration of the data in the to-be-replaced audio segment is consistent with that of the to-be-dubbed audio data, and the data in the to-be-replaced audio segment is replaced with the replacement audio data, to obtain the re-dubbed second audio file. In this way, the first audio file is consistent with the second audio file in terms of time frames, but the contained audio data has been replaced.

In one embodiment, at least one audio segment is extracted from a first audio file; at least one to-be-replaced audio segment representing a target role is recognized from the at least one audio segment; time frame information of each to-be-replaced audio segment in the first audio file is determined; to-be-dubbed audio data is obtained for each to-be-replaced audio segment, and data in the to-be-replaced audio segment is replaced with the audio data according to the time frame information, to obtain a second audio file. An automatic dubbing scheme is provided, to achieve an objective of automatically replacing the voice of the target role. In a manual dubbing method, if there are X target roles and Y replaced audio effects, and a time cost is T, the total cost is X*Y*T. Compared with the manual dubbing method, one embodiment of the present disclosure does not involve a manpower factor, and by parallelism and processing of a machine, an overall cost is only T, thus greatly saving labor costs and time costs of the dubbing, satisfying users' demands for personalized voices, and improving resource utilization of a dubbing device.

Figure 4:
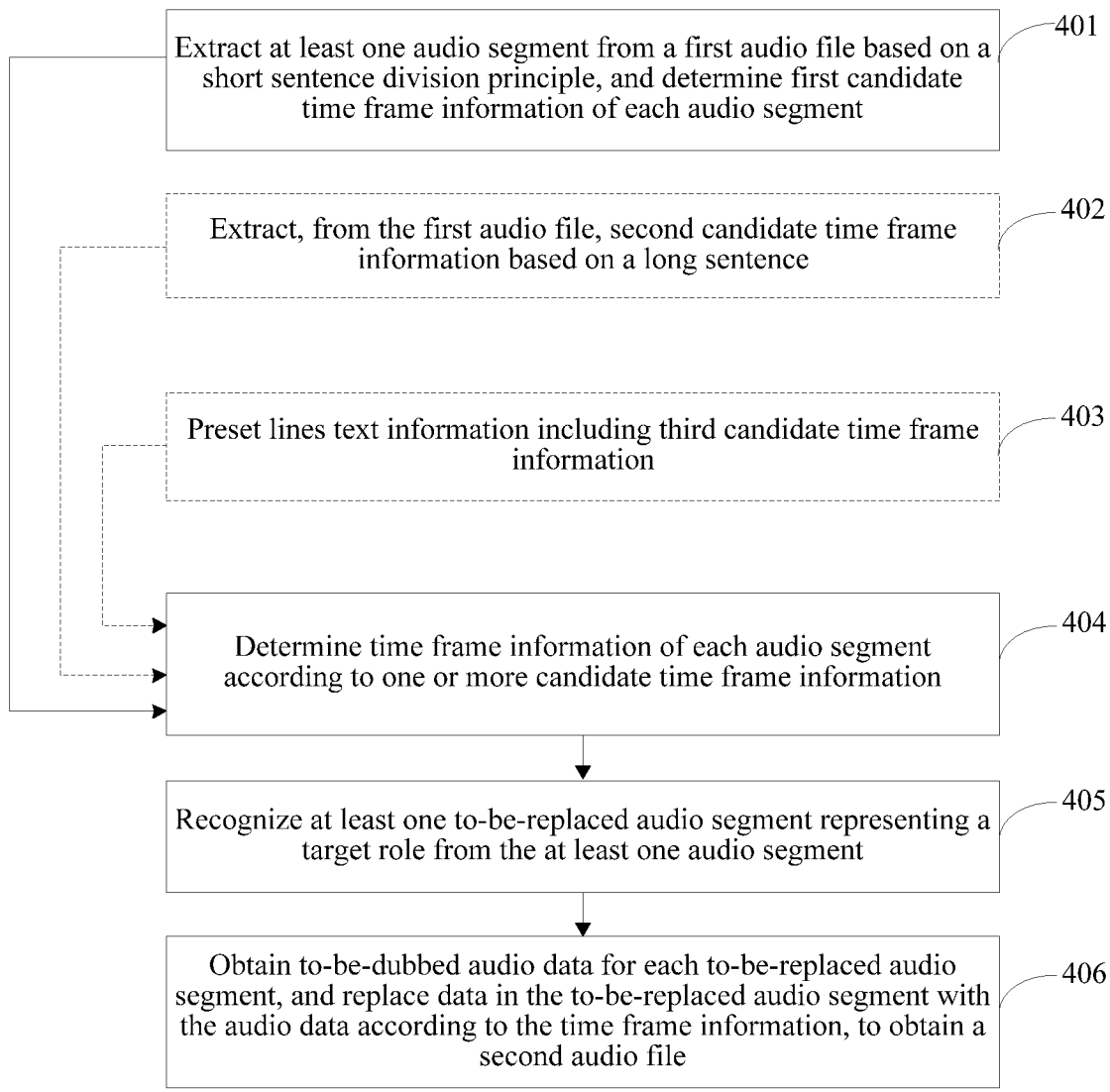
FIG. 4 is a schematic flowchart of an audio file processing method according to another embodiment of the present disclosure.

FIG. 4 is a schematic flowchart of an audio file processing method according to another embodiment of the present disclosure. The method may be performed by an audio file processing device or an electronic device such as a server. As shown in FIG. 4, the method includes the followings.

Step 401. Extract at least one audio segment from a first audio file based on a short sentence division principle, and determine first candidate time frame information of each audio segment.

A short sentence refers to a sentence with a simple structure and fewer words according to an expression habit of a language. A long sentence refers to a sentence with a complex structure and more words. In general, a complete long sentence includes a plurality of short sentences, and two successive short sentences are connected by a short pause. In this way, when the audio segment is extracted from the first audio file, extraction may be performed based on the short sentence division principle. Each audio segment corresponds to one short sentence. That is, the division is performed based on the structure and word counts in a sentence to meet the requirement of the short sentence division principle.

Each audio file corresponds a timeline. While audio segments are extracted, the first candidate time frame information of each audio segment is determined. The so-called time frame information is used for representing time segment information of the audio segment in the timeline, and includes a start time of an audio segment in the timeline, or a start time and an end time, or a start time and duration, or the like.

A plurality of extracted audio segments and the corresponding first candidate time frame information are stored in the audio file processing device or the electronic device such as a server, to facilitate subsequent replacement operations.

Figure 5:
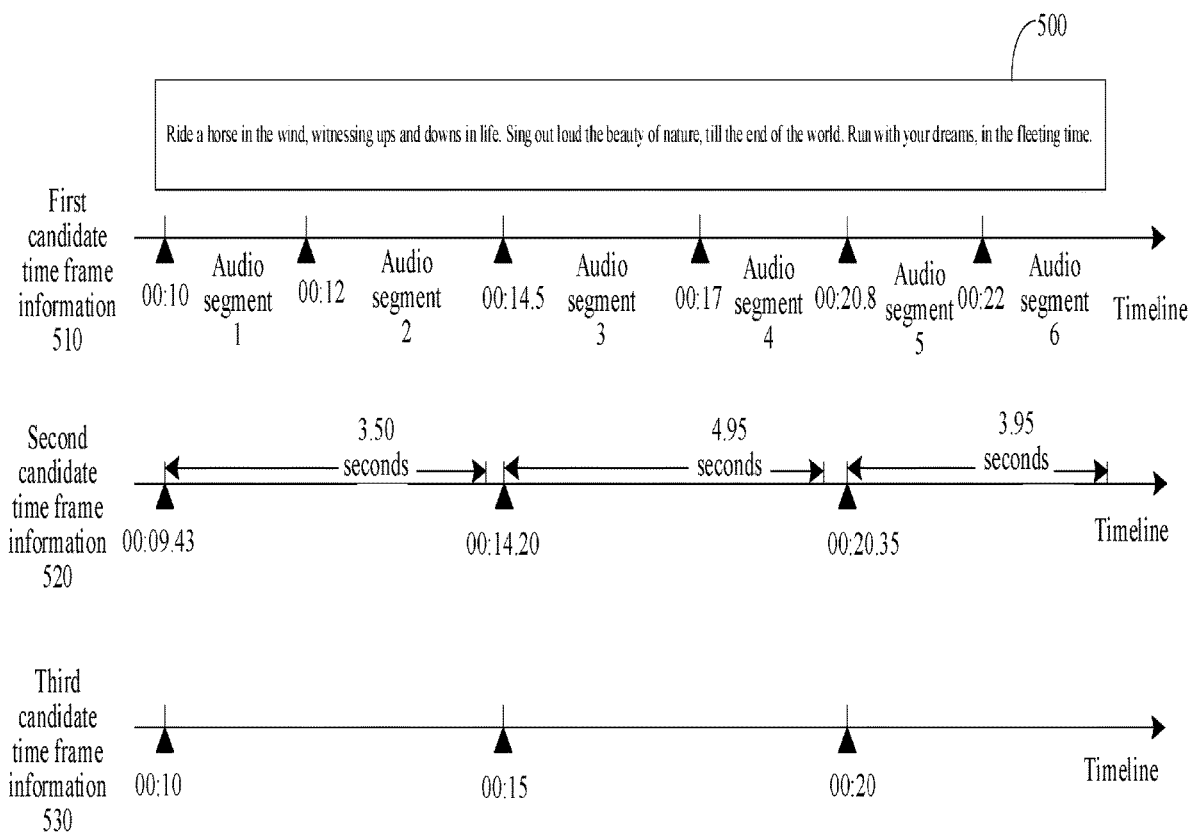
FIG. 5 is a schematic structural diagram of candidate time frame information according to an embodiment of the present disclosure.

FIG. 5 is a schematic structural diagram of candidate time frame information according to an embodiment of the present disclosure. As shown in FIG. 5, first candidate time frame information 510 includes start times of six audio segments, which are marked with black triangles in the timeline. Corresponding sentence information is given in a square frame 500. The six audio segments correspond to short sentences respectively, that is, "ride a horse in the wind", "witnessing ups and downs in life", "sing out loud the beauty of nature", "till the end of the world", "Run with your dreams", and "in the fleeting time", and the corresponding start times are 00:10, 00:12, 00:14.5, 00:17, 00:20.8, and 00:22.

Step 402. Extract, from the first audio file, second candidate time frame information based on a long sentence.

This step and the foregoing step 401 may be performed in parallel. The extraction principle is based on long sentence division, and the term long sentence refers to a sentence composed of a plurality of short sentences. The extraction method may be the same as the method described in step 201. An objective of this step is to obtain the second candidate time frame information. Therefore, the audio segment corresponding to the long sentence may be not stored.

In one embodiment shown in FIG. 5, the second candidate time frame information 520 includes three pieces of information (a start time and duration) corresponding to three long sentences, specifically, (00:9.43, 3.50 seconds), (00:14.20, 4.95 seconds), and (00:20.35, 3.95 seconds).

Step 403. Preset sentence text information including third candidate time frame information.

This step may be in parallel with the foregoing step 401 and step 402. In an audio file producing process, the sentence text information is preset, and the sentence text information includes sentences (or talking lines) and the corresponding third candidate time frame information. The sentences corresponding to the third candidate time frame information may be a short sentence, or may be a long sentence.

In one embodiment shown in FIG. 5, the third candidate time frame information 530 includes three start times corresponding to three long sentences, which are 00:10, 00:15, and 00:20, respectively.

Step 404. Determine time frame information of each to-be-replaced audio segment according to one or more pieces of candidate time frame information.

When audio replacement is performed, the time frame information determines a replacement time position, thus determining accuracy of the replacement. Various possible candidate time frame information is obtained according to step 401 to step 403. Specific determining manners are as follows:

(1) Determine the time frame information according to the first candidate time frame information.

The first candidate time frame information is obtained when the audio segment is extracted. In this case, in an embodiment, the first candidate time frame information may be directly used as the time frame information.

In another embodiment, considering that there may be a time deviation when the audio segment is extracted, the time deviation generated in extracting the audio segment may be estimated in advance, and then compensation may be made according to the time deviation when the time frame information is determined. For example, the first candidate time frame information includes start times of N audio segments. A start time of an $i^{th}$ audio segment is $t1_i$, $i=1, \ldots, N$, and the start time of the $i^{th}$ audio segment in the time frame information is $t0i=t1_i+\Delta$offset. $\Delta$offset is the time deviation, and a value thereof may be a positive value or a negative value.

(2) Determine the time frame information according to the first candidate time frame information and the second candidate time frame information.

In an embodiment, considering that the second candidate time frame information is used as separate time data, accuracy may be higher during extraction. In this case, the second candidate time frame information may be directly used as the time frame information.

In another embodiment, the first candidate time frame information is corrected according to the second candidate time frame information, to determine the time frame information. Considering that the start time and the duration are associated, correction may be performed from the two perspectives respectively, specifically including the following three methods.

In a first method, the start time in the first candidate time frame information is corrected based on the start time in the second candidate time frame information.

First, two corresponding start times in the second candidate time frame information and the first candidate time frame information are determined, and an average value, a maximum value, or a minimum value of the two start times is taken as the start time in the time frame information. The term "corresponding" herein refers to that the two start times correspond to the same position in the sentences.

If the second candidate time frame information includes start times of M audio segments, a start time of a $i^{th}$ audio segment is $t2_j$, where $j=1, \ldots, M$. Using one embodiment shown in FIG. 5 as an example, the first start time in the first candidate time frame information $t1_1=10$ s, and the first start time in the second candidate time frame information $t2_1=9.43$ s. In this case, the start time of the $i^{th}$ audio segment in the time frame information takes an average value of $t1_1$ and $t2_1$, that is, $t0_1=(t1_1+t2_1)/2=9.715$ s.

In a second method, the start time in the first candidate time frame information is corrected based on the duration in the second candidate time frame information.

First, the duration in the second candidate time frame information and two corresponding start times in the first candidate time frame information are determined, and either of the two start times is adjusted to ensure that a difference between the two start times is greater than the duration.

If the second candidate time frame information includes durations of M audio segments, the duration of a $j^{th}$ audio segment is $\Delta t2_j$, $j=1, \ldots, M$. If it is determined that two start times in the first candidate time frame information corresponding to $\Delta t2_j$ are $t1_i$ and $t1_{i+1}$, it is determined whether the following condition is met:

$$t1_{i+1} - t1_i > \Delta t2_j; \tag{1}$$

If the condition is not met, $t1_i$ is decreased or $t1_{i+1}$ is increased until the above condition is met.

In a third method, the duration in the first candidate time frame information is corrected based on the duration in the second candidate time frame information.

First, the duration in the second candidate time frame information and one or more corresponding durations in the first candidate time frame information are determined, and a maximum value of durations corresponding to the same sentence length is used as the duration in the time frame information.

In a specific application, considering that the duration in dubbing is changeable, the maximum value of the duration in the two candidate time frame information may be taken. If the first candidate time frame information includes durations of N audio segments, duration of an $i^{th}$ audio segment is $\Delta t1_i$, i=1, ..., N. If it is determined that two durations in the first candidate time frame information corresponding to $\Delta t2_j$ are $\Delta t1_i$ and $\Delta t1_{i+1}$, it is determined whether the following condition is met:

$$\Delta t1_i + \Delta t1_{i+1} < \Delta t2, \tag{2}$$

If the condition is met, a value of $\Delta t1_i$ or $\Delta t1_{i+1}$ may be increased to meet the above condition.

One of the above correction methods may be selected according to specific information included in the first candidate time frame information and the second candidate time frame information. That is, a selection is made according to a ratio between the quantity of start times and the quantity of durations. If the quantity of start times is large, the start times are corrected. Otherwise, the durations are corrected. Alternatively, considering that the duration may be limited by two adjacent start times, the value of the start time is more important, and the first method or second method above is preferred.

(3) Determine the time frame information according to the first candidate time frame information and third candidate time frame information.

In an embodiment, considering that the third candidate time frame information is derived from the sentence text information, and represents standard time data. In this case, the third candidate time frame information may be directly used as the time frame information.

In another embodiment, when it is not reliable to rely only on the sentence text information, the first candidate time frame information may be corrected according to the third candidate time frame information, and the time frame information is determined. For a specific correction method, reference may be made to description in the foregoing step 4042. The second candidate time frame information is replaced with the third candidate time frame information, and details are not repeated here.

(4) Determine the time frame information according to the first candidate time frame information, the second candidate time frame information, and the third candidate time frame information.

In this step, the first candidate time frame information may be corrected according to the second candidate time frame information and the third candidate time frame information, to determine the time frame information.

When the time frame information is determined by the three candidate time frame information, correction may be performed by referring to the three manners in the foregoing step 404(2). The corresponding start time and duration data in the three types of candidate time frame information need to be determined. The term "corresponding" means that the start time and duration data correspond to the same sentence position.

For example, referring to the first method above, three corresponding start times in the three types of candidate time frame information are determined, and an average value, a maximum value, or a minimum value of the three start times is taken as the start time in the time frame information. Alternatively, two start times having the closest value among the three start times may be selected, and then an average value, a maximum value, or a minimum value of the two start times is taken as the start time in the time frame information.

For example, referring to the second method above, a longer duration in the second candidate time frame information and the third candidate time frame information is determined, and then two corresponding start times in the first candidate time frame information are adjusted, to ensure that a difference between the two start times is greater than the longer duration.

For example, referring to the third method above, a plurality of corresponding durations in the three types of candidate time frame information is determined, and a maximum value of the durations corresponding to the same sentence length is used as the duration in the time frame information.

Step 405. Recognize at least one to-be-replaced audio segment representing a target role from the at least one audio segment.

For a recognition method, reference may be made to the description of the foregoing step 202, and details are not described herein again.

Step 406. Obtain to-be-dubbed audio data for each to-be-replaced audio segment, and replace data in the to-be-replaced audio segment with the audio data according to the time frame information, to obtain a second audio file.

For a replacement method, reference may be made to the description of the foregoing step 203, and details are not described herein again.

Accordingly, when time frame information for audio replacement is to be determined, three types of candidate information are considered comprehensively, which are obtained from short sentence extraction of the audio segment (that is, the first candidate time frame information), long sentence extraction of the entire audio file (that is, the second candidate time frame information), and the sentence text information (that is, the third candidate time frame information). The second candidate time frame information and the third candidate time frame information are optimized as separate time features. Such additional redundant time information facilitates determining an accurate position of the audio segment in the timeline, thus ensuring accuracy of the replacement of the audio feature.

Figure 6:
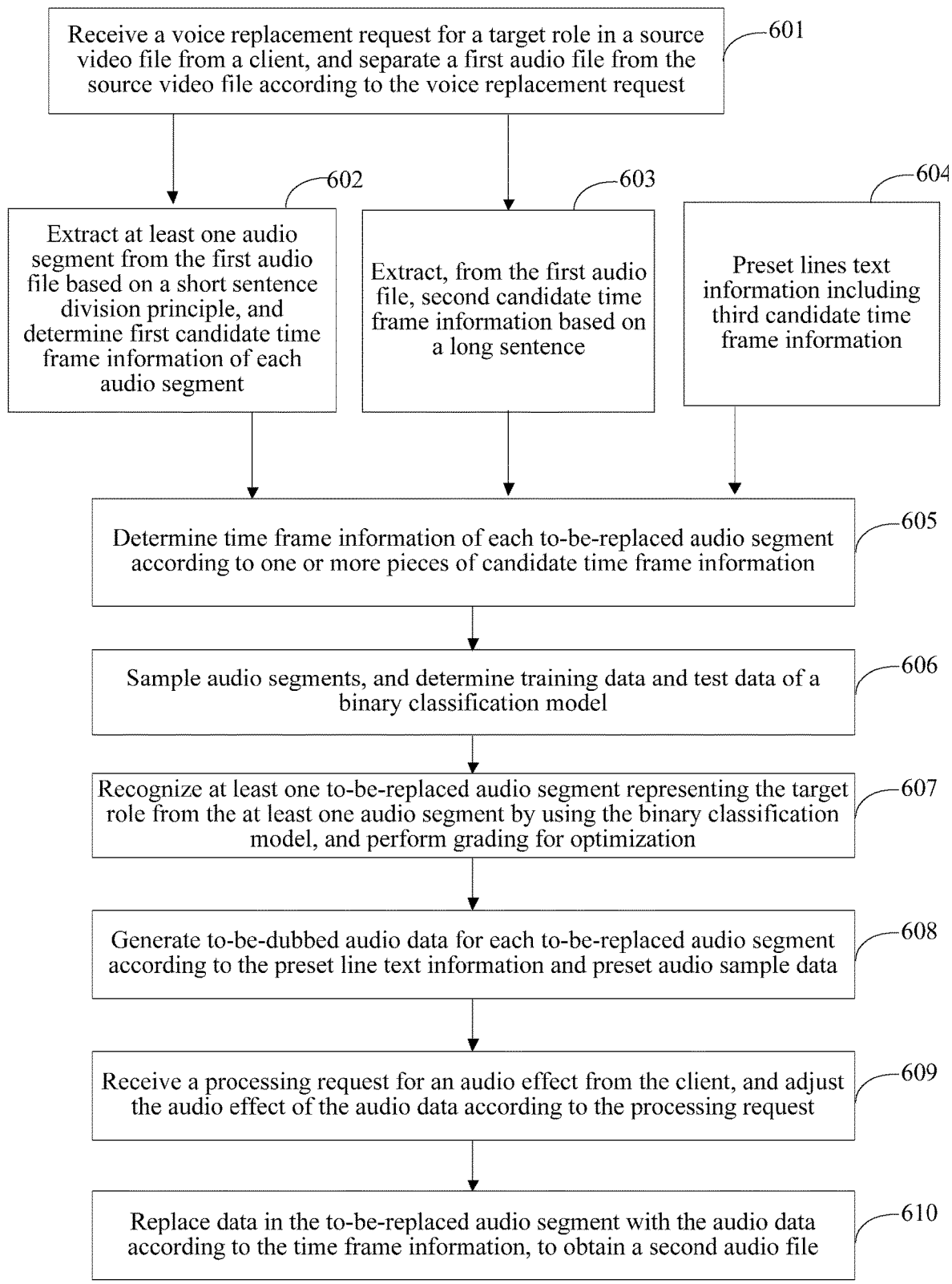
FIG. 6 is a schematic flowchart of an audio file processing method according to still another embodiment of the present disclosure.

FIG. 6 is a schematic flowchart of an audio data processing method according to an embodiment of the present disclosure. The method may be performed by an audio file processing device or an electronic device such as a server, and implements voice replacement processing for a leading actor in a source video file. Specifically, the method includes the followings.

Step 601. Receive a voice replacement request for a target role in a source video file from a client, and separate a first audio file from the source video file according to the voice replacement request.

As described in the first method in step 201, the voice replacement request carries the identifier of the source video file and the identifier of the target role. After receiving the voice replacement request, the audio file processing device obtains the source video file according to the identifier of the source video file in the request, and then separates the first audio file from the source video file.

Step 602. Extract at least one audio segment from the first audio file based on a short sentence division principle, and determine first candidate time frame information of each audio segment.

Step 603. Extract second candidate time frame information based on a long sentence division principle from the first audio file.

Step 604. Preset sentence text information including third candidate time frame information.

Step 605. Determine time frame information of each to-be-replaced audio segment according to one or more pieces of candidate time frame information.

For the processing method in step 602 to step 605, reference may be made to the descriptions of the foregoing step 401 to step 404, and details are not described herein again.

Step 606. Sample audio segments, and determine training data and test data of a binary classification model.

In an actual application, there may be a large quantity of audio segments. Therefore, it is impossible to train all TV play videos. Considering a coverage requirement, a sampling method may be used to select the training data and the test data for the training of the binary classification model.

For example, sampling is performed at a ratio of 6:4, that is, among all audio segments, 60% of the data is used for training and 40% of the data is used for testing. Stratified sampling may be used in the sampling process. For example, the entire TV play includes 40 episodes, and a certain amount of training data is extracted from each episode, so that the training data can cover all the episodes.

Step 607. Recognize at least one to-be-replaced audio segment representing the target role from the at least one audio segment by using the binary classification model, and perform grading for optimization.

As described in step 202, recognition is performed on a 0-1 relationship between a leading actor and a supporting actor, that is, the leading actor is 1, and the supporting actor is 0, which meets the binary classification model. Therefore, the binary classification model is established. In recognition of the voice of the leading actor, binary classification model training is performed by using a logistic regression-based machine learning algorithm. In a specific application, as a mature machine learning algorithm, logistic regression may be integrated into spark mllib (machine learning library), and spark may be used for concurrent training.

In addition, an output result of the binary classification model training is a possibility of the audio segment being 0 or 1. Due to the existence of possible misjudgment in the training result of the machine learning, an area under roc curve (AUC) model may be used for grading, to optimize the entire training process. That is, a score of 0 or 1 is assigned to each audio segment. 0 denotes an audio segment that misses the leading actor, and 1 denotes an audio segment that hits the leading actor. According to the scheme in one embodiment of the present disclosure, given the scoring with the label of 1, the accuracy of the AUC is required to be 0.9 or higher. That is, an accuracy rate of each audio segment being determined as 1 needs to be 90% or higher. When the accuracy of the AUC fails to reach the requirement, training is performed again.

The AUC model is a standard for measuring the quality of a classification model, and is analyzed based on a receiver operating characteristic (ROC). A main analysis tool is an ROC curve drawn on a two-dimensional plane, and a value of the AUC is an area below the ROC curve.

Step 608. Generate to-be-dubbed audio data for each to-be-replaced audio segment according to the preset sentence text information and preset audio sample data.

When the time frame information includes duration, to-be-replaced sentences corresponding to the to-be-replaced audio segment are determined from the preset sentence text information according to the duration, and the to-be-dubbed audio data is generated according to the to-be-replaced sentences and the preset audio sample data. For example, the audio sample data is a standard male voice, and corresponding to each word in the to-be-replaced line, the sample data of the standard male voice is combined, to obtain the to-be-dubbed audio data.

Step 609. Receive a processing request for an audio effect from the client, and adjust the audio effect of the audio data according to the processing request.

Specifically, the audio effect includes an audio style and an audio emotion. The processing request of the user reflects whether the audio to be replaced has a change in the style of the voice, or has a change in the emotion of the leading actor.

The so-called audio style includes distinctive voice styles such as voice shielding, voice twisting (for example, rising, falling, removing, and transforming), a female voice replaced with a male voice, a male voice replaced with a female voice, a voice of a star, and a special sound (for example, a demon sound, a magic sound, and a dolphin sound).

When the audio effect refers to the style of the audio, a target audio style is selected from at least one preset audio style based on the processing request, and the audio data is filtered according to the target audio style. For example, the processing request of the user is to change the voice of the leading actor from the male voice to the female voice. The standard female voice in the preset audio style includes female voices with various pitches. In this way, one of the plurality of standard female voices is selected as the target audio style, and the audio data is filtered.

The so-called audio emotion refers to the personal emotion of the leading actor when the leading actor voices the sentences, for example, anger, happiness, and sadness. Correspondingly, a fluctuation component of the voice occurs in the audio.

When the audio effect refers to the emotion of the audio, a target audio emotion is selected from at least one preset audio emotion based on the audio emotion; a voice frequency spectrum distribution corresponding to the target audio emotion is determined, and the audio data is filtered according to the voice frequency spectrum distribution. For example, when the user feels that the performance of the leading actor is not emotional enough, the processing request is to increase sadness of the leading actor. The preset audio emotion may include a plurality of degrees of sadness and corresponding voice frequency spectrum distributions. In this way, one of the plurality of degrees of sadness is selected as a target emotion, and the audio data is filtered.

In other embodiments, filtering processing for an audio style or emotion may be added to the generated audio data according to analysis of the audio sample data, without the processing request of the user.

Step 610. Replace data in the to-be-replaced audio segment with the audio data according to the time frame information, to obtain a second audio file.

According to the foregoing embodiment, considering users' individual demands on voices in movies and TV plays, the audio style or emotion is processed during dubbing. Various voice possibilities are introduced for boring and tedious dubbing in the existing dubbing industry. Automatic dubbing can be realized while rich audio effects are provided, satisfying users' individual demands.

Figure 7:
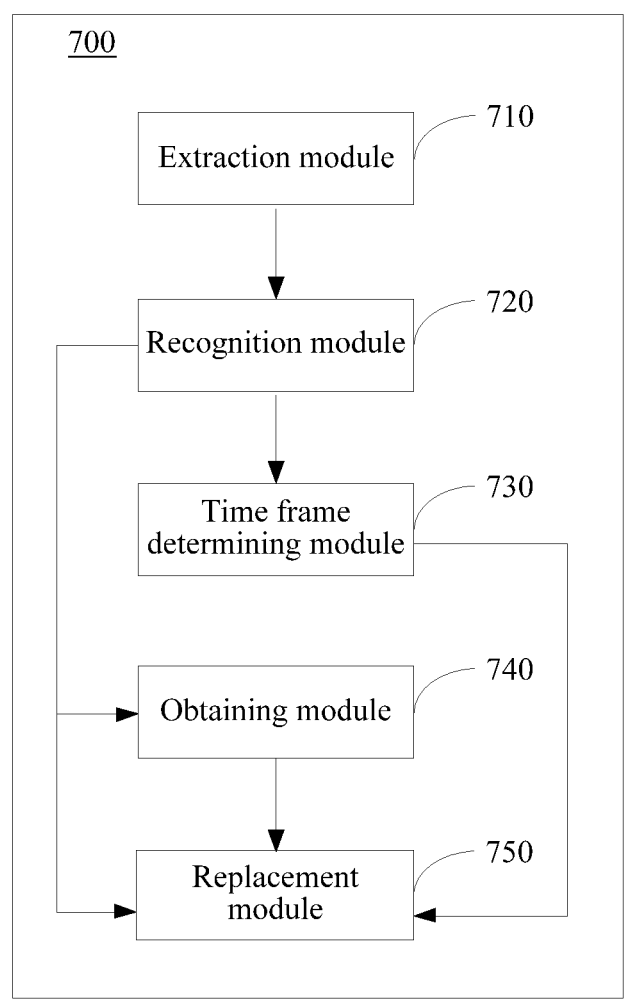
FIG. 7 is a schematic structural diagram of an audio file processing device according to an embodiment of the present disclosure.

FIG. 7 is a schematic structural diagram of an audio file processing device according to an embodiment of the present disclosure. As shown in FIG. 7, the audio file processing device 700 includes: an extraction module 710, a recognition module 720, a time frame determining module 730, an obtaining module 740, and a replacement module 750, etc.

The extraction module 710 may be configured to extract at least one audio segment from a first audio file. The recognition module 720 may be configured to recognize at least one to-be-replaced audio segment representing a target role from the at least one audio segment extracted by the extraction module 710.

The time frame determining module 730 may be configured to determine time frame information of each to-be-replaced audio segment recognized by the recognition module 720 in the first audio file. The obtaining module 740 may be configured to obtain to-be-dubbed audio data for each to-be-replaced audio segment recognized by the recognition module 720.

Further, the replacement module 750 may be configured to replace, according to the time frame information determined by the time frame determining module 730, data in the to-be-replaced audio segment with the audio data obtained by the obtaining module 740 for each to-be-replaced audio segment recognized by the recognition module 720, to obtain a second audio file.

According to the foregoing embodiment, an automatic dubbing scheme is provided, to achieve an objective of automatically replacing the voice of the target role. In a manual dubbing method, if there are X target roles and Y replaced audio effects, and a time cost is T, the total cost is X*Y*T. Compared with the manual dubbing method, one embodiment of the present disclosure does not involve a manpower factor, and by parallelism and processing of a machine, an overall cost is only T, thus greatly saving labor costs and time costs of the dubbing, satisfying users' demands for personalized voices, and improving resource utilization of a dubbing device.

Figure 8:
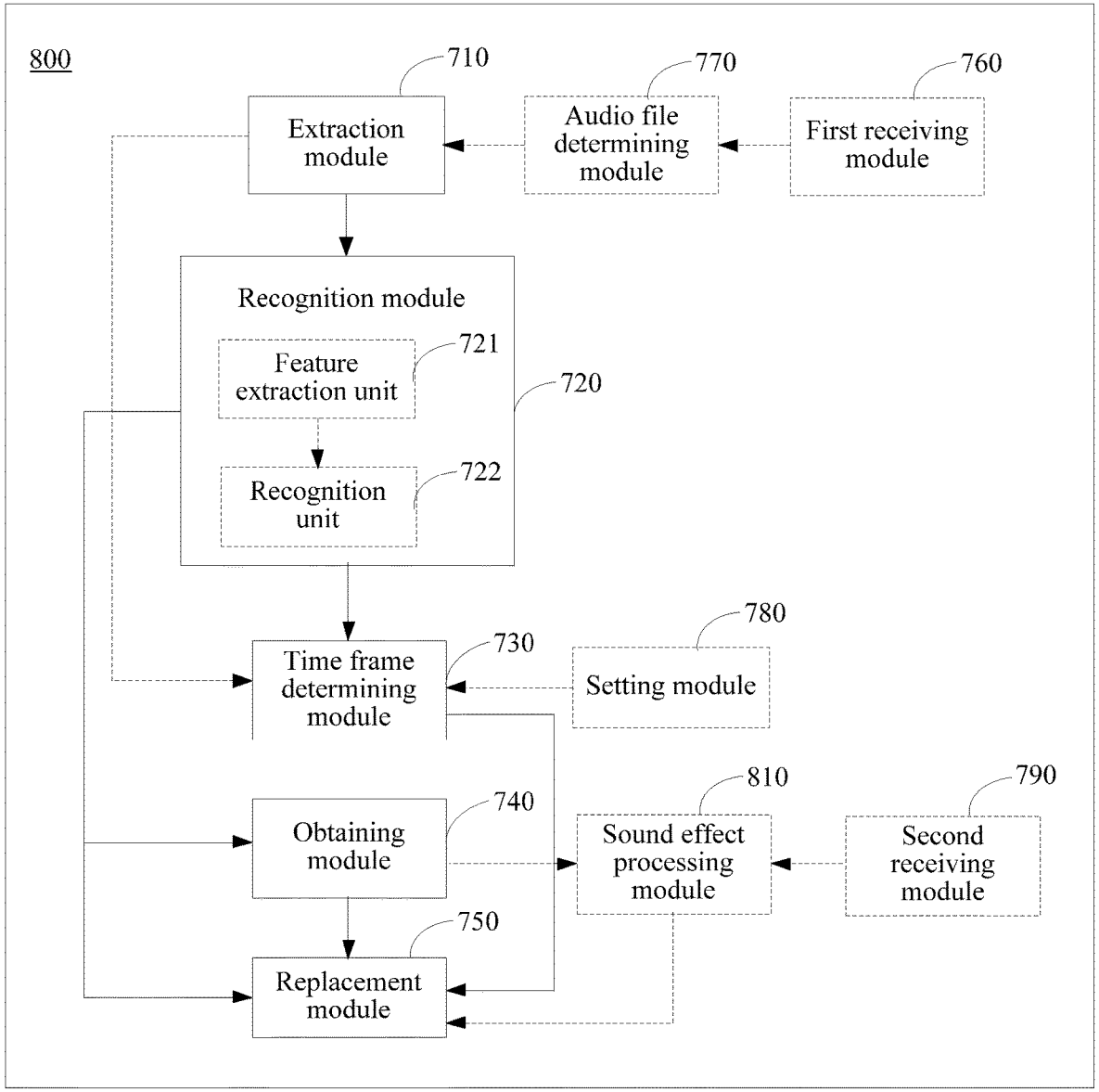
FIG. 8 is a schematic structural diagram of an audio file processing device according to another embodiment of the present disclosure.

FIG. 8 is a schematic structural diagram of an audio file processing device according to another embodiment of the present disclosure. As shown in FIG. 8, based on the audio file processing device 700 shown in FIG. 7, the audio file processing device 800 further includes: a first receiving module 760 and an audio file determining module 770.

The first receiving module 760 may be configured to receive a voice replacement request for a target role in a source video file from a client. The audio file determining module 770 may be configured to separate a first audio file from the source video file according to the voice replacement request received by the first receiving module 760.

In an embodiment, the recognition module 720 includes: a feature extraction unit 721 configured to extract an audio feature of each audio segment; and a recognition unit 722 configured to recognize at least one to-be-replaced audio segment representing a target role from the at least one audio segment according to the audio feature extracted by the feature extraction unit 721.

In an embodiment, the extraction module 710 is configured to extract the at least one audio segment from the first audio file based on a short sentence division principle, and determine first candidate time frame information of each audio segment.

The time frame determining module 730 is configured to determine the time frame information according to the first candidate time frame information determined by the extraction module 710.

In an embodiment, the audio file processing device 800 further includes a setting module 780 configured to preset sentence text information including third candidate time frame information. The extraction module 710 may be further configured to extract, from the first audio file, second candidate time frame information based on a long sentence; and the time frame determining module 730 may be configured to correct the first candidate time frame information according to the second candidate time frame information extracted by the extraction module 710 and the third candidate time frame information set by the setting module 780, and determine the time frame information.

In an embodiment, the time frame information includes duration, and the obtaining module 740 is configured to determine to-be-replaced sentences corresponding to the to-be-replaced audio segment from the preset sentence text information according to the duration, and generate the to-be-dubbed audio data according to the to-be-replaced sentences and preset audio sample data.

In an embodiment, the audio file processing device 800 further includes a second receiving module 790 configured to receive a processing request for an audio effect from a client; and a sound effect processing module 810 configured to adjust, according to the processing request received by the second receiving module 790, the audio effect of the audio data obtained by the obtaining module 740.

Accordingly, the second candidate time frame information and the third candidate time frame information are optimized as separate time features, and such additional redundant time information facilitates determining an accurate position of the audio segment in the timeline, thus ensuring accuracy of the replacement of the audio feature. In addition, considering users' individual demands for voices in movies and television plays, the audio style or emotion is processed during dubbing. Various voice possibilities are introduced for boring and tedious dubbing in the existing dubbing industry. Automatic dubbing can be realized while rich audio effects are provided, satisfying users' individual demands.

Figure 9:
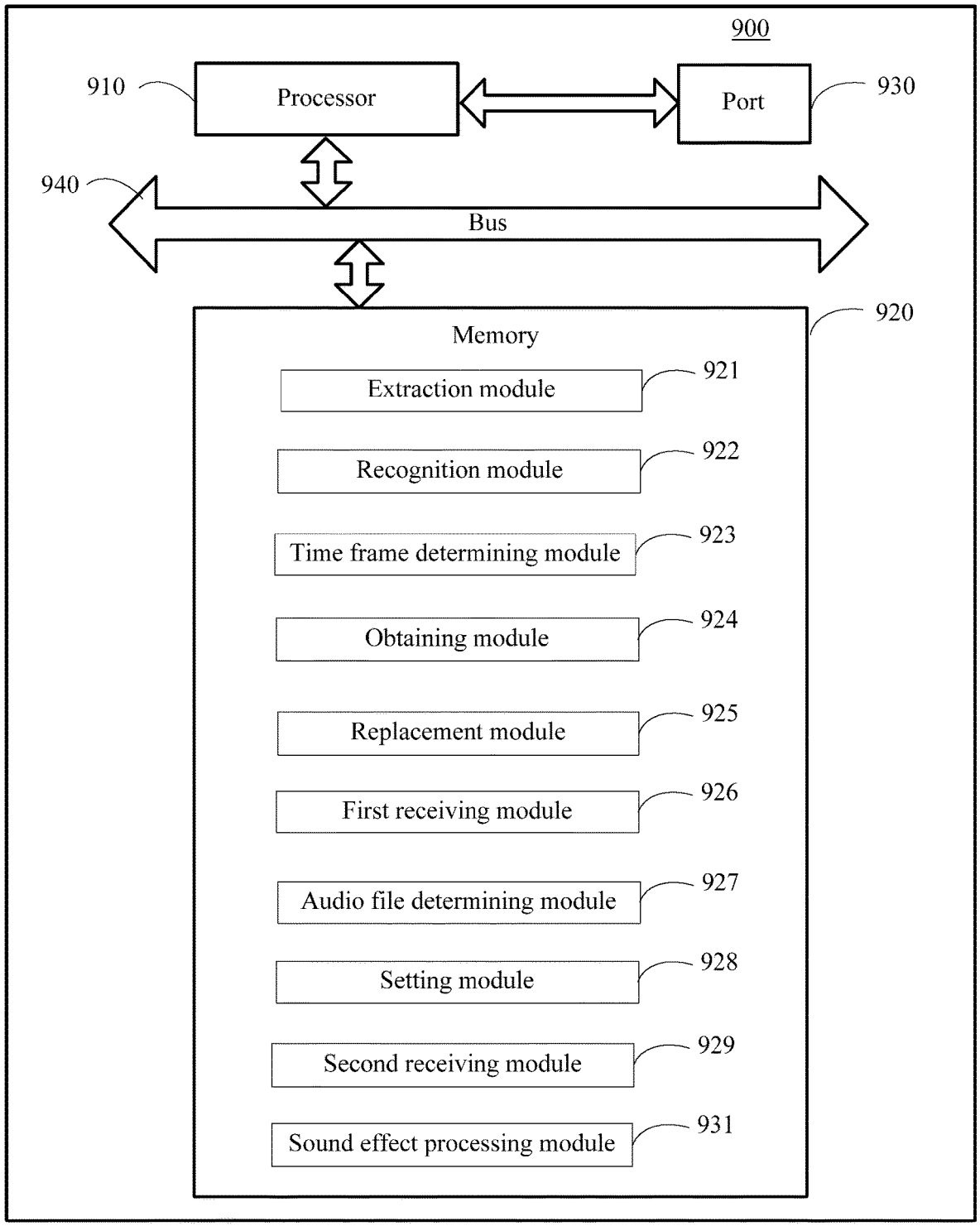
FIG. 9 is a schematic structural diagram of an electronic device according to an embodiment of the present disclosure.

FIG. 9 is a schematic structural diagram of an electronic device according to an embodiment of the present disclosure. As shown in FIG. 9, the electronic device 900 may include: a processor 910, a memory 920, a port 930, and a bus 940. The processor 910 is interconnected to the memory 920 by using the bus 940. The processor 910 may receive and send data by using the port 930.

The processor 910 is configured to execute a machine readable instruction module stored in the memory 920.

The memory 920 stores the machine readable instruction module executable by the processor 910. The instruction module executable by the processor 910 includes: an extraction module 921, a recognition module 922, a time frame determining module 923, an obtaining module 924, and a replacement module 925.

When being executed by the processor 910, the extraction module 921 may: extract at least one audio segment from a first audio file; when being executed by the processor 910, the recognition module 922 may: recognize at least one to-be-replaced audio segment representing a target role from the at least one audio segment extracted by the extraction module 921; when being executed by the processor 910, the time frame determining module 923 may: determine time frame information of each to-be-replaced audio segment recognized by the recognition module 922 in the first audio file; when being executed by the processor 910, the obtaining module 924 may: obtain to-be-dubbed audio data for each to-be-replaced audio segment recognized by the recognition module 922; and when being executed by the processor 910, the replacement module 925 may: replace, according to the time frame information determined by the time frame determining module 923, data in the to-be-replaced audio segment with the audio data obtained by the obtaining module 924 for each to-be-replaced audio segment recognized by the recognition module 922, to obtain a second audio file.

In an embodiment, the instruction module executable by the processor 910 further includes a first receiving module 926 and an audio file determining module 927.

When being executed by the processor 910, the first receiving module 926 may: receive a voice replacement request for a target role in a source video file from a client; and when being executed by the processor 910, the audio file determining module 927 may: separate the first audio file from the source video file according to the voice replacement request received by the first receiving module 926.

In another embodiment, when being executed by the processor 910, the first receiving module 926 may: receive a voice replacement request for a target role in a source audio file from a client; and when being executed by the processor 910, the audio file determining module 927 may: determine the source audio file identified in the voice replacement request received by the first receiving module 926 as the first audio file.

In an embodiment, when being executed by the processor 910, the extraction module 921 may: extract the at least one audio segment from the first audio file based on a short sentence division principle, and determine first candidate time frame information of each audio segment; and when being executed by the processor 910, the time frame determining module 923 may: determine time frame information according to the first candidate time frame information determined by the extraction module 921.

In an embodiment, the instruction module executable by the processor 910 further includes a setting module 928.

When being executed by the processor 910, the setting module 928 may: preset sentence text information including third candidate time frame information; when being executed by the processor 910, the extraction module 921 may: extract, from the first audio file, second candidate time frame information based on a long sentence; and when being executed by the processor 910, the time frame determining module 923 may: correct the first candidate time frame information according to the second candidate time frame information extracted by the extraction module 921 and the third candidate time frame information set by the setting module 928, and determine the time frame information.

In an embodiment, the instruction module executable by the processor 910 further includes a second receiving module 929 and a sound effect processing module 931.

When being executed by the processor 910, the second receiving module 929 may: receive a processing request for an audio effect from the client; and when being executed by the processor 910, the sound effect processing module 931 may: adjust, according to the processing request received by the second receiving module 929, the audio effect of the audio data obtained by the obtaining module 924, and use the adjusted audio data for replacement performed by the replacement module 925.

It may be learned from the above that, when being executed by the processor 910, the instruction module stored in the memory 920 can implement various functions of the extraction module, the recognition module, the time frame determining module, the obtaining module, the replacement module, the first receiving module, the audio file determining module, the setting module, the second receiving module, and the sound effect processing module in the foregoing embodiments.

In the foregoing electronic device embodiments, specific methods for each module and unit to implement respective functions are all described in the method embodiments, and details are not repeated here.

In addition, functional modules in one embodiments of the present disclosure may be integrated into one processing unit, or each of the modules may exist alone physically, or two or more modules may be integrated into one unit. The integrated unit may be implemented in a form of hardware, or may be implemented in a form of a software function unit.

In addition, each embodiment of the present disclosure may be implemented by a data processing program that is executed by a data processing device such as a computer. Apparently, the data processing program constitutes the present disclosure. In addition, generally the data processing program stored in a storage medium is executed by directly reading the program from the storage medium or by installing or copying the program to a storage device (such as a hard disk or memory) of the data processing device. Therefore, such a storage medium also constitutes the present disclosure. The storage medium may use any type of recording manner, such as a paper storage medium (such as a paper tape), a magnetic storage medium (such as a floppy disk, a hard disk, or a flash memory), an optical storage medium (such as a CD-ROM), or a magneto-optical storage medium (such as an MO).

Therefore, the present disclosure further discloses a storage medium, which stores a data processing program. The data processing program is used for executing any embodiment of the foregoing method of the present disclosure.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. An audio file processing method via a user interface of a terminal in communication with a processing device, the method comprising:
   receiving, via the user interface of the terminal, a voice replacement request for a target role in a first audio file, by:
   receiving, via the user interface of the terminal, a right-click trigger on the user interface;
   displaying, on the user interface, a pop up window, the pop up window showing a list of actor roles whose voice is replaceable; and
   receiving, via the pop up window on the user interface, a user selection of the target role from the list of actor roles as displayed;
   sending, by the terminal, the voice replacement request to the processing device, the voice replacement request including an identifier of the first audio file and an identifier of the target role as selected;

receiving, by the processing device, the voice replacement request from the terminal;

determining, by the processing device, time frame information of a to-be-replaced audio segment in the first audio file according to the voice replacement request, by:

extracting, by the processing device, first candidate time frame information from the to-be-replaced audio segment based on a short sentence division principle, and obtaining a first start time t1 in the first candidate time frame information;

extracting, by the processing device, second candidate time frame information from the to-be-replaced audio segment based on a long sentence division principle, and obtaining a first start time t2 in the second candidate time frame information; and setting an average of t1 and t2 as the time frame information of the to-be-replaced audio segment;

replacing data in the to-be-replaced audio segment with to-be-dubbed audio data according to the time frame information, to obtain a second audio file; and sending, by the processing device, the second audio file to the terminal.

2. A terminal, comprising: a processor; and a memory, the memory storing computer instructions executable by the processor, wherein the processor is configured to execute the computer instruction to perform a method via a user interface of the terminal in communication with a processing device, the method including:

receiving, via the user interface of the terminal, a voice replacement request for a target role in a first audio file, by:

receiving, via the user interface of the electronic device terminal, a right-click trigger on the user interface;

displaying, on the user interface, a pop up window, the pop up window showing a list of actor roles whose voice is replaceable; and receiving, via the pop up window on the user interface, a user selection of the target role from the list of actor roles as displayed;

sending, by the terminal, the voice replacement request to the processing device, the voice replacement request including an identifier of the first audio file and an identifier of the target role as selected;

receiving, by the processing device, the voice replacement request from the terminal;

determining, by the processing device, time frame information of a to-be-replaced audio segment in the first audio file according to the voice replacement request, by:

extracting, by the processing device, first candidate time frame information from the to-be-replaced audio segment based on a short sentence division principle, and obtaining a first start time $t1_1$ in the first candidate time frame information;

extracting, by the processing device, second candidate time frame information from the to-be-replaced audio segment based on a long sentence division principle, and obtaining a first start time $t2_1$ in the second candidate time frame information; and setting an average of $t1_1$ and $t2_1$ as the time frame information of the to-be-replaced audio segment;

replacing data in the to-be-replaced audio segment with to-be-dubbed audio data according to the time frame information, to obtain a second audio file; and sending, by the processing device, the second audio file to the terminal.

3. A non-transitory computer-readable storage medium storing computer program instructions executable by at least one processor of a terminal to perform a method via a user interface of the terminal in communication with a processing device, the method including:

receiving, via the user interface of the terminal, a voice replacement request for a target role in a first audio file, by:

receiving, via the user interface of the terminal, a right-click trigger on the user interface;

displaying, on the user interface, a pop up window, the pop up window showing a list of actor roles whose voice is replaceable; and receiving, via the pop up window on the user interface, a user selection of the target role from the list of actor roles as displayed;

sending, by the terminal, the voice replacement request to the processing device, the voice replacement request including an identifier of the first audio file and an identifier of the target role as selected;

receiving, by the processing device, the voice replacement request from the terminal;

determining, by the processing device, time frame information of a to-be-replaced audio segment in the first audio file according to the voice replacement request, by:

extracting, by the processing device, first candidate time frame information from the to-be-replaced audio segment based on a short sentence division principle, and obtaining a first start time $t1_1$ in the first candidate time frame information;

extracting, by the processing device, second candidate time frame information from the to-be-replaced audio segment based on a long sentence division principle, and obtaining a first start time $t2_1$ in the second candidate time frame information; and setting an average of $t1_1$ and $t2_1$ as the time frame information of the to-be-replaced audio segment;

replacing data in the to-be-replaced audio segment with to-be-dubbed audio data according to the time frame information, to obtain a second audio file; and sending, by the processing device, the second audio file to the terminal.

4. The method according to claim 1, wherein the to-be-replaced audio segment is $N^{th}$ audio segment in the first audio file, and wherein the first start time t1 or the second start time t2 is obtained according to a start time $t_{N-1}$ of an N-1$^{th}$ audio segment before the to-be-replaced audio segment.

* * * * *